United States Patent Office 3,152,376
Patented Oct. 13, 1964

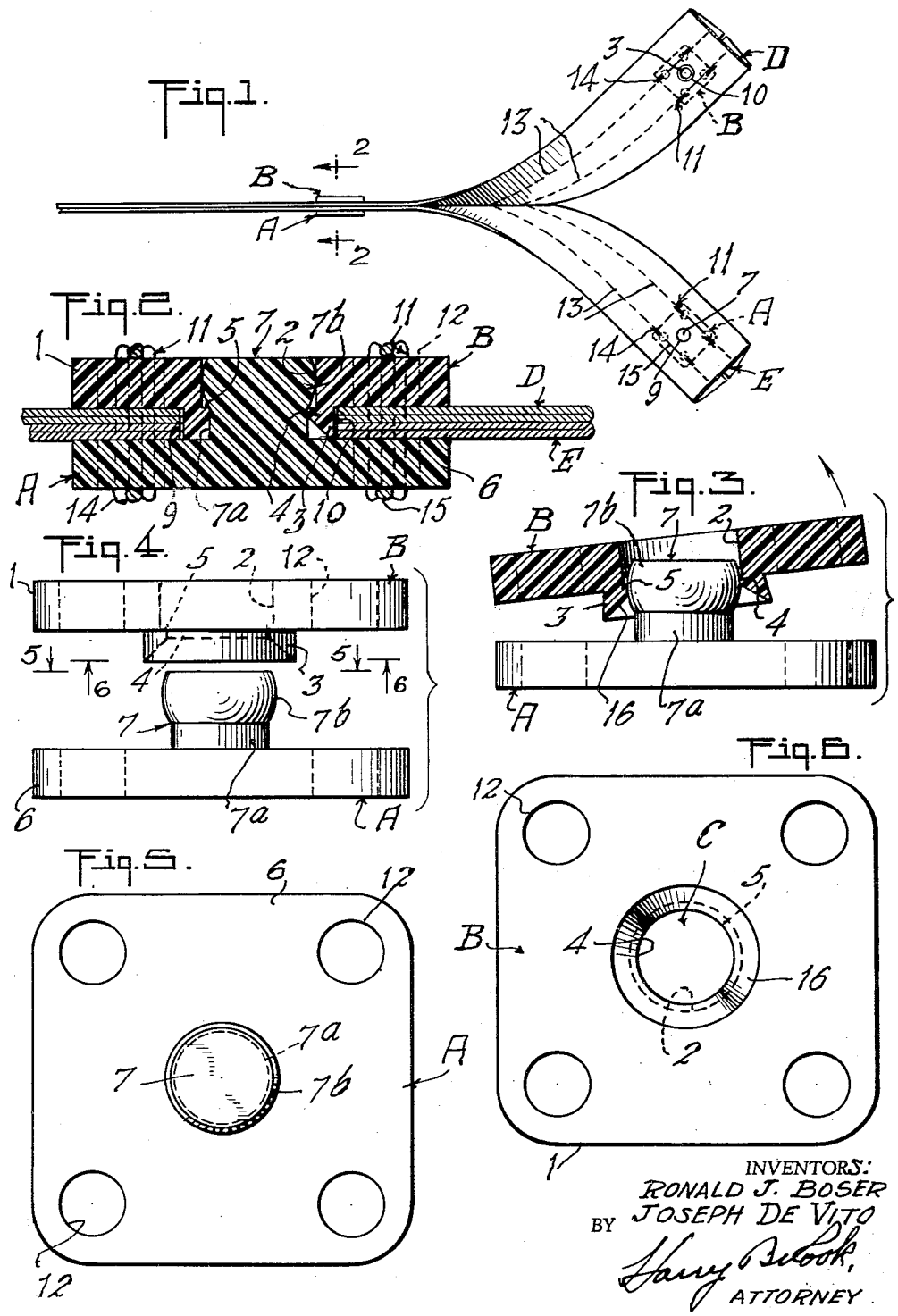

3,152,376
SNAP FASTENER
Ronald J. Boser, 5 North Lane, Huntington, N.Y., and Joseph De Vito, 261—42 Langston Ave., Glen Oaks, N.Y.
Filed Oct. 9, 1963, Ser. No. 314,932
4 Claims. (Cl. 24—216)

This invention relates to so-called snap fasteners or head and socket fasteners of the type that comprise a head element and a socket element that can be repeatedly connected and disconnected to and from one another, respectively, by simple manual manipulation and without the use of tools; and more particularly the invention is directed to snap fasteners formed of polymeric or synthetic plastic materials. The invention especially contemplates such separable fasteners that are adaptable for use on garments, bags and envelopes.

Snap fasteners made of polymeric materials are known, as are also snap fasteners formed of organic material such as ivory or bone or synthetic materials including casein or cellulose acetate. However, both types of these fasteners leave much to be desired. The fasteners made of natural organic materials such as ivory are bulky and large as compared with metal snap fasteners, and either the resilient grip between the head element and socket element is inadequate, or the force required to separate the elements is too great for manual manipulation of the elements. To overcome these difficulties, one or both of the elements has been slit to provide resilient arms but due to the brittleness of the material, thick parts are required, the fastener elements are bulky and the arms are broken.

Known head and socket elements formed of polymeric materials have substantial resilient extensibility and require substantial distortion or stretching and flexing of the whole socket element during separation of the elements, and there is substantial looseness or play between the two elements when they are connected together.

A primary object of the present invention is to provide a separable fastener formed of polymeric material which shall include novel and improved features in construction whereby the head element and socket element can be easily connected together by simple manual pressing of the two elements together, the connection between the elements is tight without play between the elements and is strongly resistant to separation in the direction of the axes of the head and socket, and yet the elements can be easily and quickly separated by simple tilting of one of the elements relatively to the other.

Another object is to provide such a fastener which is especially adapted to use in garments or on other articles and is capable of resisting substantial strains imposed on the fastener elements in the direction perpendicular to the axes of the heads and sockets to prevent tilting or pulling the elements apart.

Still further objects are to provide a separable snap fastener formed of polymeric or synthetic plastic material in which the socket element and the head element are constructed in a novel and improved manner whereby the two elements can be firmly but resiliently connected together so as to eliminate relative movement of the two elements in all directions both perpendicular to and in line with the axes of the heads and sockets; and thus to provide a head element and a socket element of such construction that the head element shall have a contactual sliding relation to the walls of the socket in the socket element and the resilient engagement of the head and the wall of the socket shall automatically draw the two elements into positive abutting contact with each other in a plane perpendicular to the axes of the head and socket.

Other objects, advantages and results of the invention will be brought out in the following description in conjunction with the accompanying drawing in which FIGURE 1 is a perspective view of a separable fastener including complemental head elements and socket elements secured on flexible strips or tapes for use, for example, on garments;

FIGURE 2 is a greatly enlarged vertical section on the plane of the line 2—2 of FIGURE 1 with edge portions of the tapes broken away and showing the head element and socket element in normal connected relation to each other;

FIGURE 3 is a view similar to FIGURE 2, with the tapes omitted, showing the manner of separating the head element and socket element;

FIGURE 4 is a composite side elevation of the two fastener elements in separated relation;

FIGURE 5 is a top plan view of the head element viewed from the plane of the line 5—5 of FIGURE 4; and FIGURE 6 is a bottom plan view of the socket element viewed from the plane of the line 6—6 of FIGURE 4.

Specifically describing the illustrated embodiment of the invention, the reference characters A and B designate the head element and the socket element, respectively, each of which is a self-sustaining single piece molded of hard, rigid and tough polymeric material, preferably a formaldehyde based polymer generally known as acetal resin and sold by Du Pont under the trademark "Delrin." This material is tough and hard, having a Shore Durometer reading of about D–83; it possesses a small degree of resiliency and elasticity, does not easily stretch and is not easily deformed but has some memory, being capable of recovering after slight deformation.

The socket element B comprises a rigid plate-like body 1 that is shown as approximately square in plan and having a central socket C that is provided by a cylindrical hole 2 that extends through the plate and through a circular tubular boss 3 that projects perpendicularly from one side of the body. The size of the body may vary but in one form may be .400 inch square. The length of the boss may vary but preferably is slightly less than the thickness of body 1, which in the form shown is of the order of .050 inch. Projecting inwardly from the tube walls of the boss is a coaxial circumferentially continuous flange 4 of an internal diameter less than the hole 2 which in that specific form shown is of the order of .118 inch, and the flange provides a narrow shoulder 5 intermediate the ends of the hole facing away from and substantially in a common plane with the side of the body from which the boss projects, in a plane perpendicular to the axis of the hole. The thickness of the tubular walls of the boss may vary, but preferably is of an order slightly less than the length of the boss which in the specific form mentioned is of the order of .035 inch.

The head element A comprises a rigid plate-like body 6 from which projects a stud 7 perpendicularly to one side of the body. The stud has a cylindrical portion 7a of a diameter to provide contactual sliding clearance between itself and the interior surface of the flange 4 on the socket element, and the stud also has an enlarged segmentally spherical solid head 7b that intersects said cylindrical portion 7a in a plane that is perpendicular to the axis of the stud and at a distance from the side of the body from which the stud projects, not greater, preferably less, than the length of the boss on the socket element. The portion of the head of the largest diameter provides a contactual sliding clearance between itself and the wall of the hole 2 in the socket element.

When it is desired to connect the two fastener elements together, the head of the stud is disposed at the end of the boss in axial alignment of the hole 2 of the socket element, and the elements are manually pressed together or toward each other. The head 7b snaps past the flange 4 into contact with the cylindrical portion of the walls of the hole 2 of the socket element, and the shoulder 5 of the flange of the socket resiliently engages said head between the largest diameter thereof and the cylindrical portion 7a of the stud as best shown in FIGURE 2, thereby resiliently resisting axial withdrawal of the stud from the socket and at the same time pulling the elements together to cause the end of the boss abuttingly to contact the body of the head element, as shown in FIGURE 2. It will thus be seen that the head firmly contacts the walls of the socket hole 2 and the flange 4 so as to effectively resist lateral strains on the fastener elements in their own planes and also resist relative movement of the elements away from each in the direction of the axes of the stud and socket. The contact between the shoulder 5 of the flange 4 with the head 7b and the contact of the end of the boss with the upper surface of the body of the head element takes up all the looseness or lost motion between the two fastener elements. Also the contact of the head with the wall of the hole and the contact of the flange with the stud tends to resist relative tilting of the two fastener elements although the resistance is such that the parts will yield uniformly throughout the circumferences of the boss and the head under pressures exerted on the fastener elements by the fingers tending to pull the head member axially out of socket or under forces tending to tilt one element relatively to the other as shown in FIGURE 3, so that the elements can be separated without difficulty.

Preferably the stud is of a length equal to the combined lengths of the body B and the boss 3 of the socket element, and the end face of the stud is preferably flat so that when the two elements are connected together said end face will be flush with the corresponding side of the body B of the socket element. Preferably the end of the hole at the boss is countersunk as indicated at 16 to facilitate the initial entry of the head into the hole and the slight separation of the walls of the boss.

The invention contemplates the association of the two plastic elements A and B with other articles such as garments, bags, and the like. The invention especially contemplates the fastening of the fastener elements A and B on the strips of flexible material D and E preferably needle-penetrable fabric, to provide so-called fastener tapes. As shown, one or more head elements A are secured on one of the tapes in spaced relation longitudinally of the tape, while complemental socket elements B are secured on the other tape.

The tape E carrying the head element abuts the side of the body 6 from which the stud 7 projects and the tape has a hole 9 through which the stud projects. The tape D abuts the side of the body B of the socket element from which the boss projects and the tape has a hole 10 through which the boss extends. The aggregate thickness of the two tapes is preferably such that when the two fastener elements A and B are secured together, the end of the boss is permitted to abut the body of the stud; in other words, the aggregate thickness of the two tapes is preferably slightly less than the length of the boss.

The fastener elements may be secured on the tape in any suitable manner but perferably are secured by stitches 11 that pass through holes 12 in the bodies of the fastener elements, over portions of the fastener elements and penetrate the corresponding tapes. As shown in FIGURE 1, there are lines of stitches 13 extending longitudinally of the tapes with superposed or tying stitches 14 passing through the holes in the fastener elements and over the edges of the elements, and stitches 15 extending from one group of tying stitches to the other group.

While the invention has been shown as embodied in certain features of the construction and in certain materials it will be understood by those skilled in the art that the details of construction and shapes of the parts, as well as the materials of which the parts are formed, may be modified or changed within the spirit and scope of the invention.

We claim:

1. A separable fastener including a head element and a socket element each of which is a self-sustaining single piece molded of hard rigid tough polymeric material possessing a small degree of resiliency and elasticity, the socket element comprising a rigid plate-like body having a socket provided by an approximately cylindrical hole therethrough and an approximately circular tubular boss projecting perpendicularly from one side of the body and through which said hole extends providing tubular walls, said boss having an inwardly projecting coaxial circumferentially continuous flange of internal diameter less than the hole and providing a narrow shoulder intermediate the ends of said hole and facing away from said side of the body from which the boss projects in a plane perpendicular with the axis of the hole, said head element comprising a rigid plate-like body having a stud projecting perpendicularly from one side of the body, said stud having a cylindrical portion of a diameter to provide a contactual sliding clearance between itself and the interior surface of said flange on the socket element, said stud also having an enlarged coaxial segmentally spherical solid head intersecting said cylindrical portion of the stud in a plane that is perpendicular to the axis of the stud and at a distance from said side of the plate-like body approximately the same as the length of said boss on the socket element, the largest diameter of said head providing a contactual sliding clearance between itself and the wall of said hole, whereby when said elements are pressed together with the stud disposed at the end of said boss in axial alignment with said hole, said head will snap past said flange into contact with the cylindrical portion of the walls of said hole and said shoulder of the flange will resiliently engage said head between the largest diameter thereof and the cylindrical portion of the stud to resiliently resist axial withdrawal of the stud and to pull the end of the boss into contact with the body of the head element so as to connect said elements together, said elements being separable by relative expansion of the walls of the boss and compression of the head uniformly throughout their circumferences upon application of forces to the elements tending to pull said head out of the socket.

2. A separable fastener as defined in claim 1 with the addition of two elongated strips of flexible material one of which abuts the side of said head element from which said stud projects and has an opening through which said stud passes, and the other strip abuts the side of said socket element from which projects said boss and has an opening through which the boss extends, the aggregate thickness of said strips being not greater than the distance between the opposed sides of the head and the socket element when said elements are connected together, and means firmly connecting each element to its corresponding strip of material.

3. A separable fastener as defined in claim 2 wherein said strips of material are needle-penetrable, and the last-named means comprises stitches passing through openings in the bodies of the head element and the socket element and penetrating the corresponding strips of material.

4. A separable fastener as defined in claim 1 wherein said hole at the end of said boss is countersunk, said stud is of a length equal to the combined thickness of said plate-like body and the length of said boss of the socket element and has a flat end surface perpendicular to its axis.

References Cited in the file of this patent
UNITED STATES PATENTS

| | | |
|---|---|---|
| 2,585,897 | Johnson | Feb. 12, 1952 |
| 3,019,152 | Jones | Jan. 30, 1962 |

FOREIGN PATENTS

| | | |
|---|---|---|
| 598,144 | Canada | May 17, 1960 |